United States Patent
Kelley et al.

(10) Patent No.: US 6,926,990 B2
(45) Date of Patent: Aug. 9, 2005

(54) FUEL CELL HAVING POROUS ELECTRODES AND METHOD FOR FORMING SAME

(75) Inventors: Ronald J. Kelley, Coral Springs, FL (US); Steven D. Pratt, Ft. Lauderdale, FL (US); Sivakumar Muthuswamy, Plantation, FL (US); Robert W. Pennisi, Boca Raton, FL (US)

(73) Assignee: Motorola, Inc., Schaumburg, IL (US)

( * ) Notice: Subject to any disclaimer, the term of this patent is extended or adjusted under 35 U.S.C. 154(b) by 342 days.

(21) Appl. No.: 10/231,828

(22) Filed: Aug. 29, 2002

(65) Prior Publication Data

US 2004/0043282 A1 Mar. 4, 2004

(51) Int. Cl.[7] .............................................. H01M 4/86
(52) U.S. Cl. ............................ 429/40; 429/42; 429/43
(58) Field of Search ............................... 429/40, 42, 43

(56) References Cited

U.S. PATENT DOCUMENTS

| | | | |
|---|---|---|---|
| 4,031,291 A | | 6/1977 | Fullenwider |
| 5,738,905 A | | 4/1998 | Bevers et al. |
| 5,761,793 A | | 6/1998 | Bevers et al. |
| 5,766,788 A | * | 6/1998 | Inoue et al. .................. 429/42 |
| 5,843,519 A | * | 12/1998 | Tada .......................... 427/115 |
| 6,015,635 A | * | 1/2000 | Kawahara ..................... 429/42 |
| 6,187,468 B1 | | 2/2001 | Shinkai et al. |
| 6,280,872 B1 | | 8/2001 | Ozaki et al. |
| 6,338,809 B1 | | 1/2002 | Hampden-Smith et al. |
| 6,344,291 B1 | * | 2/2002 | Hitomi ........................ 429/42 |
| 6,399,202 B1 | | 6/2002 | Yu et al. |

* cited by examiner

*Primary Examiner*—Dah-Wei Yuan
(74) *Attorney, Agent, or Firm*—Randi L. Karpinia

(57) ABSTRACT

A fuel cell device has a composite particle electrode (200) formed using particles (210) having a combination of ion conductor material, electron conductor material, and catalyst material. Each composite particle (210) is preferably formed to have a substantially spherical outer layer (480) of ion conductor material (481) with conductive and catalyst particles (482, 484) are dispersed throughout the outer layer (480). An array of composite particles (210) is layered in a substantially structured or ordered manner on a membrane support structure (220) to form the fuel cell electrode. A fuel cell electrode so formed has interstitial gaps between the composite particles that result in a structure permeable to oxygen and other fluids.

17 Claims, 4 Drawing Sheets

```
                    START
                      │
                      ▼
          ┌─────────────────────────┐  ╱─710
          │  MIX PLATINUM AND CARBON │
          │    TO PERPARE CATALYST   │
          └─────────────────────────┘
                      │
                      ▼
          ┌─────────────────────────┐  ╱─720
          │     PREPARE CONDUCTOR    │
          │    PARTICLES FROM CARBON │
          └─────────────────────────┘
                      │
                      ▼
      ┌────────────────────────────────┐  ╱─730
      │ MIX CONDUCTOR, CATALYST, AND   │
      │ ELECTROLYTE WITH WATER AND/OR  │
      │            ALCOHOL             │
      └────────────────────────────────┘
                      │
                      ▼
      ┌────────────────────────────────┐  ╱─740
      │ ATOMIZE MIXTURE ULTRASONICALLY │
      │   WITH A CARRIER GAS TO FORM   │
      │             AEROSOL            │
      └────────────────────────────────┘
                      │
                      ▼
          ┌─────────────────────────┐  ╱─750
          │    HEAT AEROSOL MIXTURE  │
          └─────────────────────────┘
                      │
                      ▼
          ┌─────────────────────────┐  ╱─760
          │  COLLECT COMPOSITE PARTICLES │
          └─────────────────────────┘
```

FUEL CELL HAVING POROUS ELECTRODES AND METHOD FOR FORMING SAME

TECHNICAL FIELD

This invention relates in general to fuel cells, and particularly, to fuel cell electrodes.

BACKGROUND

Fuel cells are electrochemical cells in which a free energy change resulting from a fuel oxidation reaction is converted into electrical energy. A typical fuel cell consists of a fuel electrode (anode) and an oxidant electrode (cathode), separated by an ion-conducting electrolyte. The electrodes are ordinarily arranged into a membrane electrode assembly (MEA). An external circuit conductor electrically connects the electrodes to a load, such as an electronic circuit. In the circuit conductor, electric current is transported by the flow of electrons, whereas in the electrolyte it is transported by the flow of ions, such as the hydrogen ion (H+) in acid electrolytes, or the hydroxyl ion (OH−) in alkaline electrolytes. In theory, any substance capable of chemical oxidation that can be supplied continuously (as a gas or fluid) can be oxidized as the fuel at the anode of the fuel cell. Similarly, the oxidant can be any material that can be reduced at a sufficient rate. Gaseous hydrogen has become the fuel of choice for most applications, because of its high reactivity in the presence of suitable catalysts and because of its high energy density. At the fuel cell cathode, the most common oxidant is gaseous oxygen, which is readily and economically available from the air for fuel cells used in terrestrial applications.

When gaseous hydrogen and oxygen are used as fuel and oxidant, the electrodes are preferably porous to permit the gas-electrolyte junction to be as great as possible. The electrodes must be electronic conductors, and possess the appropriate reactivity to give significant reaction rates. At the anode, incoming hydrogen gas ionizes to produce hydrogen ions and electrons. Since the electrolyte is a non-electronic conductor, the electrons flow away from the anode via the metallic external circuit. At the cathode, oxygen gas reacts with hydrogen ion migrating through the electrolyte and the incoming electrons from the external circuit to produce water as a byproduct. The byproduct water is typically extracted through evaporation. The overall reaction that takes place in the fuel cell is a sum of the anode and cathode reactions, with part of the free energy of reaction released directly as electrical energy. As long as hydrogen and oxygen are fed to a properly functioning fuel cell, the flow of electric current will be sustained by electronic flow in the external circuit and ionic flow in the electrolyte.

Fuel cell electrodes have been made by a variety of processes but usually involve the mixing of carbon material, catalyst material, and electron conductive material, and the disposition of this mixture onto membrane support structure. One such process is described in U.S. Pat. No. 6,280,872 issued to Ozaki et al. on Aug. 28, 2001 and entitled, "ELECTRODE FOR FUEL CELL AND A METHOD FOR PRODUCING THE ELECTRODE". Here, an electrolyte membrane is coated with catalyst material and a paste containing carbon particles overlaid onto the catalyst-coated membrane. Another process is described in U.S. Pat. No. 5,738,905, issued to Bevers on Apr. 14, 1998, and entitled "PROCESS FOR THE PRODUCTION OF A COMPOSITE COMPRISING ELECTRODE MATERIAL, CATALYST MATERIAL, AND A SOLID-ELECTROLYTE MEMBRANE". Here, a catalytic powder consisting of electrode material, catalyst material and solid-electrolyte material is heated to form a composite which is used for an electrode.

The performance of a fuel cell depends in part on the number of reaction sites present in the fuel cell electrodes. For example, a cathode must have available three-phase boundary reaction sites for efficient operation. One problem often found with prior art fuel cells is that the number of reaction sites is limited as a result of the process used in manufacturing the electrode. FIG. 1 shows a fragmentary cross-sectional view of a typical prior art fuel cell electrode 100. In construction, ionic conductor material or ionomer 102, catalyst material 103, and electron conductor material 104 are mixed in a paste or slurry and the electrodes formed from this mixture on a membrane structure 105. As a result, the electrode has a random structure. For the reaction to occur at the cathode, the catalyst material, electron conductor material, ionic conductor material, and oxygen must be simultaneously in contact with each other. As the structure is a random mixture of material, many of the catalyst sites are placed such that they are buried and inactive. Additionally, the ionic conductor must be permeable to oxygen. As in many prior art implementations, the ionomer coats the carbon and catalyst particles to varying degrees of thickness. Oxygen diffuses slowly through areas having a thick coating of ionomer, thereby limiting fuel cell performance. Particularly, a reduction in oxygen diffusion rate generally translates to a reduction in maximum current in a fuel cell. In certain cases, some of the catalyst sites have little or no ionomer coating. When the electrode is used as an anode, the absence an ionomer coating means that the reaction rate at that catalyst site is limited, as there is no proton path to the catalyst site. This limits the low current performance of the fuel cell.

An improved electrode is needed to address the electrochemical issues described for prior art fuel cell. The electrode structure should also be improved to provide for increased management control for water produced at the reaction sites.

BRIEF DESCRIPTION OF THE DRAWINGS

FIG. 7 is a flowchart of procedures used to form the composite particle, in accordance with the present invention.

DETAILED DESCRIPTION OF THE PREFERRED EMBODIMENT

The present invention provides for a fuel cell device having a composite particle fuel cell electrode that promotes efficiency and high performance. The electrode is formed using composite particle having a combination of ion conductor material, electron conductor material, and catalyst material. Preferably, each composite particle is formed to have a substantially spherical outer layer of ion conductor material with conductive and catalyst particles are dispersed throughout the outer layer. An array of composite particles is layered in a substantially structured or ordered manner on a membrane or other support structure to form the fuel cell electrode. A fuel cell electrode so formed has interstitial gaps between the composite particles that result in a structure permeable to oxygen and other fluids. Significantly, the electrode has a substantial number of three-phase boundary reaction sites distributed throughout for increased performance. In one aspect of the invention, hydrophobic and/or hydrophilic particles are distributed among the interstitial gaps to facilitate hydration control.

Figure 1:
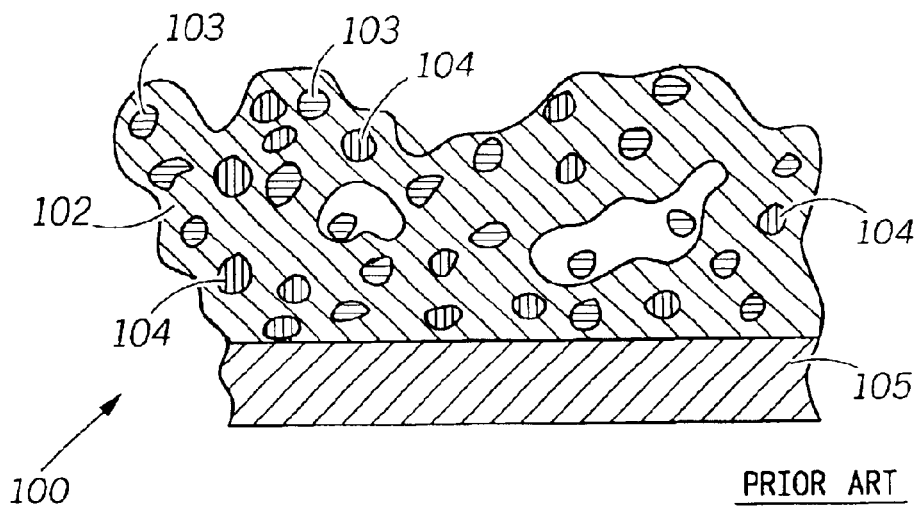
FIG. 1 is a fragmentary cross-sectional view of a prior art fuel cell electrode.
Figure 2:
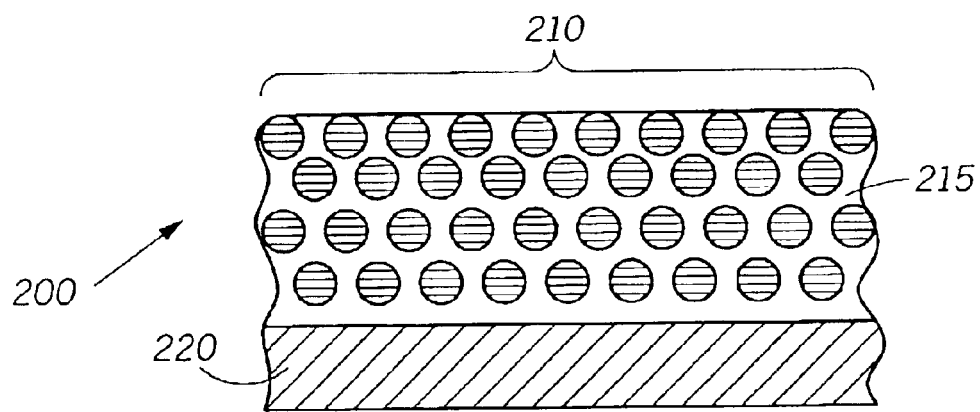
FIG. 2 is a cross-sectional view of a portion of a fuel cell electrode, in accordance with the present invention.
Figure 3:
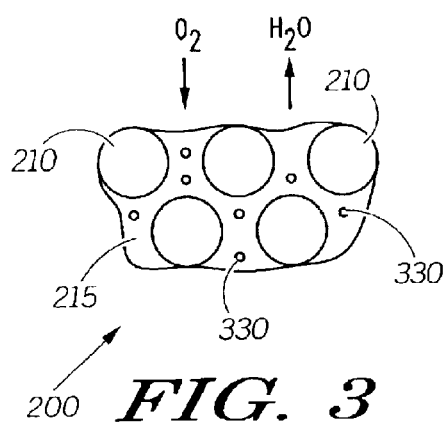
FIG. 3 is a more detailed subset of the portion of the fuel cell electrode of FIG. 2, in accordance with the present invention.

FIG. 2 shows a fragmentary cross-sectional view of a fuel cell electrode 200, in accordance with the present invention. FIG. 3 shows an enlarged portion of the electrode 200. The figures show the electrode 200 with exaggerated dimensions to highlight significant features and to facilitate their description. The electrode 200 has an array of composite particles 210 arranged on a supporting membrane structure 220. The composite particles 210 are preferably substantially spherical in shape, and arranged to have a relatively ordered structure in which each composite particle 210 physically interfaces with, or is adjacent to, one or more other composite particles 210. The substantially spherical shape of the composite particles allow for the formation of a large number of interstitial gaps i.e., spatial gaps between the composite particles, within the structure. Preferably, the structure has at least two percent interstitial gaps by volume. The structure is therefore porous in nature and permeable to fluids such as oxygen, water, and/or other reactants and by-products present during fuel cell operation. In the preferred embodiment, the electrode 200 has hydrophobic and/or hydrophilic particles 330 distributed among the interstitial gaps.

Figure 4:
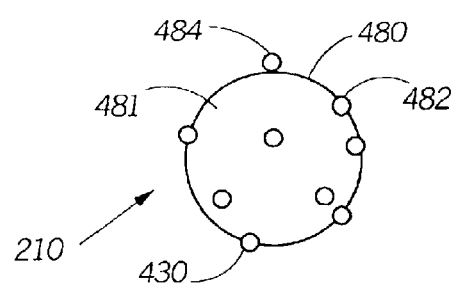
FIG. 4 shows the surface of a composite particle, in accordance with the present invention.
Figure 5:
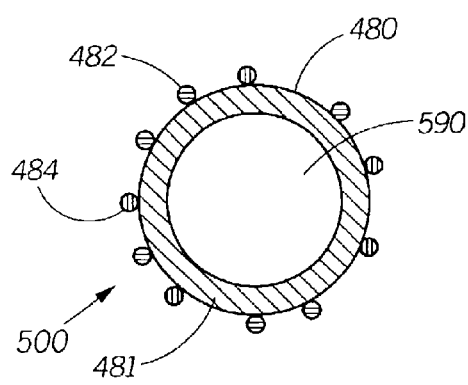
FIG. 5 shows a cross-sectional view of a first embodiment of the composite particle, in accordance with the present invention.
Figure 6:
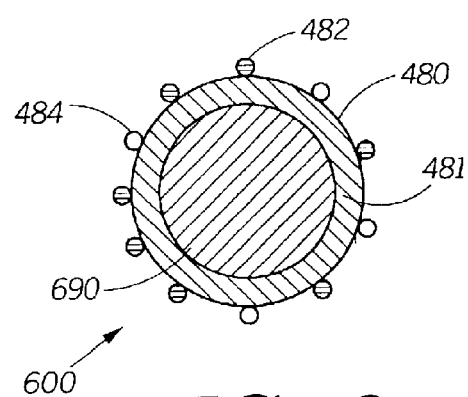
FIG. 6 shows a cross-sectional view of a second embodiment of the composite particle, in accordance with the present invention.
Figure 8:
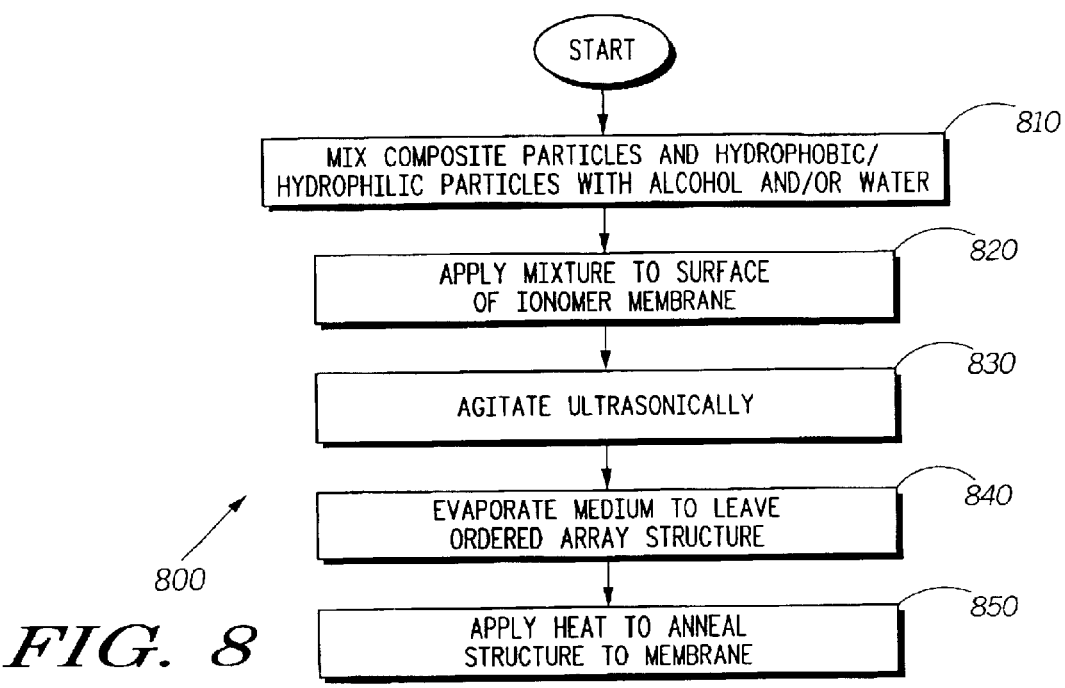
FIG. 8 is a flowchart of procedures for forming a fuel cell electrode, in accordance with the present invention.
Figure 9:
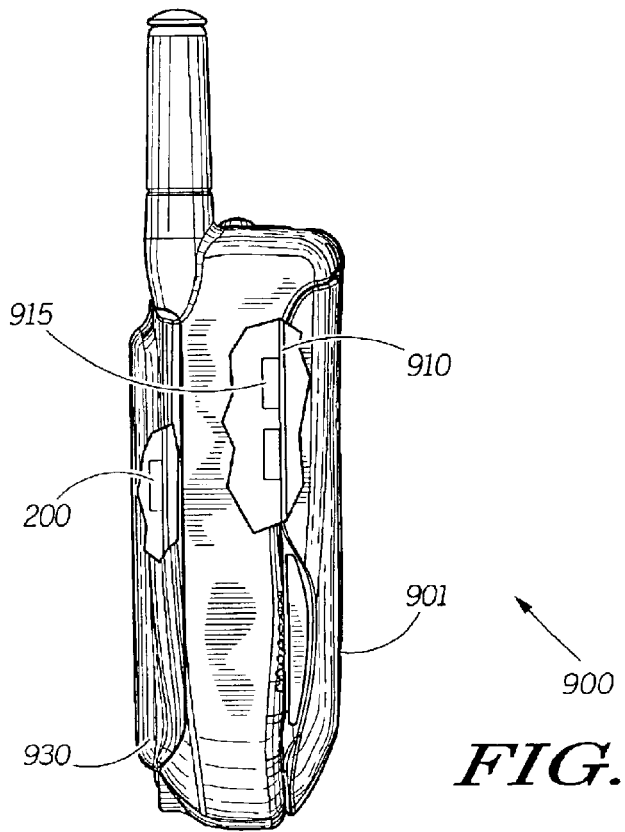
FIG. 9 shows a cutaway view of a portable electronic device that incorporates a fuel cell having a fuel cell electrode formed in accordance with the present invention.

FIG. 4 shows the external surface of an individual composite particle 210 used to form fuel cell electrodes, in accordance with the present invention. FIG. 5 and FIG. 6 show cross-sectional views of different embodiments 500, 600 of the composite particle 210. The particle 400 is formed using a three-phase mixture of ionic conductor material, electron conductor material, and catalyst material. As shown, the composite particle 210 has a core 590, 690 and an outer layer 480 surrounding the core. The outer layer 480 consists primarily of ionomer material 481 with electron conductor 482 and catalyst particles 484 dispersed or distributed throughout in a random manner. The ionomer material 481 is preferably a solid-electrolyte material, such as is commercially available under the brand name Nafion™. The electron conductor material 482 is preferably carbon, and the catalyst material 484 a combination of carbon and platinum particles. The core 590, 690 may be formed from any suitable material selected based on cost or structural considerations. In the first embodiment 500, the 590 core is hollow, i.e., it is formed from air or other combination of gases, while in the second embodiment 600, the core 690 is solid and formed from an inert material such as aluminum oxide, polystyrene, or silica.

Both hollow core and solid core composite particles can be formed using an ultrasonic and atom vaporizing process similar to that described in U.S. Pat. No. 6,338,809 B1 issued to Hapden-Smith et al. on Jan. 15, 2002, for an AEROSOL METHOD AND APPARATUS, PARTICULATE PRODUCTS, AND ELECTRONIC DEVICES MADE THEREFROM, the entire contents of which are hereby incorporated by reference. FIG. 7 shows a flowchart of procedures 700 outlining the manufacturing process for forming composite particles, in accordance with the present invention. Nano-sized particles of catalyst material are made by applying platinum particles to carbon particles, such that the ratio of platinum particles to carbon particles is on the order of thirty percent (30%) to forty percent (40%) platinum on carbon, step 710. The application of platinum to carbon can be done with a wet chemical process or with other processes well known in the art. Separately, nano-sized carbon particles are formed using well-know processes, step 720. Preferably, the carbon and platinum/carbon particles are 100 nanometers or less in diameter. The carbon and platinum/carbon particles are mixed together with 5% w/w of Nafion™ 1100 solution, or EC-NS-05 from ElectroChem corporation, or other commercially available solid electrolyte particles, and with water and/or alcohol to produce a liquid feed that includes as major constituents, one or more flowable liquids, step 730. The mixture is then atomized ultrasonically with a carrier gas to generate an atom vapor or aerosol stream using an aerosol generator, step 740. Atomization refers to the formation of tiny droplets of sufficiently small size to allow preparation of an aerosol and may be accomplished using ultrasonic transducers. The carrier gas can be any gaseous medium that will support the droplets in aerosol form. The aerosol stream is directed through a furnace that heats the stream to evaporate the liquids thereby producing spherical composite particles that are dispersed in gas exiting the furnace, step 750. These particles are then collected using a particle collector, step 760. In an alternative method, spheres from aluminum oxide, polystyrene, silica, or other suitable material are formed to have sizes substantially larger than the carbon or platinum/carbon particles. A substantially uniformed size is preferred, for example, on the order of 100 to 1000 microns. These spheres are immersed into or otherwise coated with a mixture of carbon particles, platinum/carbon particles, and Nafion™ or other electrolyte material and atomized as described above. A three-phase mixture of the Nafion™, platinum/carbon, and carbon material will coat the larger spheres to form composite particles having a solid core.

The hydrophobic particles are polystyrene micro-spheres ranging in size from approximately two to several hundred microns in diameter. Another suitable material is polytetrafluoroethylene (PTFE) dispersed in alcohol. The hydrophilic particles are microspheres with high surface levels of hydrophilic monomers, like acrylic acid and acrylamide. Silica microspheres are also suitable hydrophilic particles. The hydrophilic and/or hydrophobic particles are preferably substantially smaller in size than the composite particles.

FIG. 8 shows a flowchart of procedures 800 for forming a composite particle electrode, in accordance with a preferred embodiment of the present invention. The composite particles, together with the hydrophobic and/or hydrophilic particles, are mixed with alcohol, water, or other suitable medium, such that the particles are dispersed within the medium, step 810. The mixture is then sprayed, "painted" or otherwise applied to the surface of the ionomer membrane material, step 820. The spherical particles will naturally settle into a substantially ordered patterned array type structure. To assist in the even dispersion of the spheres, the membrane and particles are agitated ultrasonically to aide in the lateral dispersion of the material, step 830. The alcohol or other dispersal medium is evaporated such that the dispersed micro-spherical composite particles into an ordered array of spheres, step 840. The membrane and the coating of spheres are then annealed in an oven at 100 degrees Celsius to 130 degrees Celsius to promote adhesion of the spheres to the membrane, step 850. In this manner, the composite particles form an ordered array structure in a uniformed manner over an ionomer membrane material. The structure has interstitial gaps that in the preferred embodiment contain hydrophobic and/or hydrophilic particles.

FIG. 900 shows a fuel cell powered electronic device 900, in accordance with the present invention. The device 900 of the preferred embodiment is a radio communication device, such as a mobile telephone, that communicates over radio frequency channels. Accordingly, the device 900 has a housing 901 that captures an antenna for receiving and transmitting radio frequency signals, and a circuit substrate sub-assembly 910 having electronics 915 for processing the radio frequency signals. The device 900 has a fuel cell device 930 that provides power to the device electronics 915. The fuel cell device 930 incorporates the fuel cell electrode 200 described earlier for high performance operation.

A fuel cell electrode formed according to the present invention has significant advantages over the prior art. The structure is naturally porous allowing oxygen to easily combine with the ionomer, catalyst, and electron conductor particles at numerous three phase boundary reaction sites distributed throughout. The structure also facilitates the management of reaction byproducts through the strategic use of hydrophobic and/or hydrophilic particles.

What is claimed is:

1. A fuel cell device, comprising an electrode formed, at least in part, using composite particles, each composite particle having a combination comprising ionic conductor material, electron conductor material, and catalyst material, wherein the composite particles comprise a core and an outer layer encapsulating the core, wherein the core and outer layer have different compositions of materials, wherein the outer layer is formed, at least in part, from the ionic conductor material, wherein the electronic conductor and catalyst materials are randomly dispersed in the ionic conductor material, and wherein the core is hollow.

2. The fuel cell device of claim 1, wherein the composite particles have a spherical shape.

3. The fuel cell device of claim 1, further comprising a membrane support, wherein the electrode is formed from composite particles distributed in an ordered pattern on the membrane support.

4. The fuel cell device of claim 1, wherein the composite particles are arranged in a structure such that each composite particle physically interfaces with another composite particle, and such that the structure has interstitial gaps distributed between the composite particles.

5. The fuel cell device of claim 4, wherein the structure comprises at least two percent interstitial gaps by volume.

6. The fuel cell device of claim 4, further comprising hydrophobic particles within at least some of the interstitial gaps.

7. The fuel cell device of claim 4, further comprising hydrophilic particles within at least some of the interstitial gaps.

8. A fuel cell, comprising:

a membrane; and an electrode disposed on the membrane, the electrode having a porous structure comprising composite particles arranged to have interstitial gaps between the composite particles;

wherein each of the composite particles comprises ionic conductor material, electron conductor material, and catalyst material, wherein the composite particles comprise a core and an outer layer encapsulating the core, wherein the core and outer layer have different compositions of materials, wherein the outer layer is formed, at least in part, from the ionic conductor material, wherein the electronic conductor and catalyst materials are randomly dispersed in the ionic conductor material, and wherein the core is hollow.

9. The fuel cell of claim 8, wherein the composite particles have a spherical shape.

10. The fuel cell of claim 9, wherein the structure comprises at least two percent interstitial gaps by volume.

11. The fuel cell of claim 10, wherein the electron conductor material comprises copper.

12. The fuel cell of claim 10, wherein the catalyst material comprises platinum.

13. A method of forming a fuel cell, comprising the steps of:

providing spherical composite particles comprising ionic conductor material, electron conductor material, and catalyst material by:

forming an outer layer by randomly dispersing the electronic conductor and catalyst materials in the ionic conductor material, and encapsulating a hollow core with the outer layer, wherein the core and outer layer have different compositions of materials; and disposing the composite particles on a membrane support structure in an ordered pattern to form an electrode.

14. The method of claim 13, wherein the step of providing composite particles comprises the steps of:

combining ionic conductor material, electron conductor material, and catalyst material into a flowable liquid mixture;

processing the mixture to generate an aerosol stream; and heating the aerosol stream to evaporate liquids and to produce the composite particles.

15. The method of claim 14, wherein the step of disposing the composite particles comprises the steps of:

applying the composite particles to the membrane support structure; and agitating the membrane support structure and composite particles to orderly disperse the composite particles on the membrane support structure.

16. The method of claim 15, wherein the step of applying the composite particles comprises the steps of spraying the composite particles onto the membrane support structure.

17. A fuel cell device, comprising an electrode formed, at least in part, using composite particles, each composite particle having a combination comprising ionic conductor material, electron conductor material, and catalyst material, wherein the composite particles comprise a core and an outer layer encapsulating the core, wherein the core and outer layer have different compositions of materials, and wherein the core is hollow.

* * * * *